United States Patent
Sasagawa et al.

(10) Patent No.: US 11,305,759 B2
(45) Date of Patent: Apr. 19, 2022

(54) VEHICLE CONTROL APPARATUS

(71) Applicant: TOYOTA JIDOSHA KABUSHIKI KAISHA, Toyota (JP)

(72) Inventors: Wataru Sasagawa, Susono (JP); Kazuyuki Fujita, Gotemba (JP); Minami Sato, Ebina (JP); Miyuki Kamatani, Susono (JP); Takahisa Awata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 16/659,828

(22) Filed: Oct. 22, 2019

(65) Prior Publication Data

US 2020/0122719 A1    Apr. 23, 2020

(30) Foreign Application Priority Data

Oct. 23, 2018 (JP) .............................. JP2018-199341

(51) Int. Cl.
 *B60W 30/09* (2012.01)
 *G08G 1/16* (2006.01)
 *B60W 30/095* (2012.01)

(52) U.S. Cl.
 CPC ........ *B60W 30/09* (2013.01); *B60W 30/0956* (2013.01); *G08G 1/166* (2013.01); *B60W 2554/00* (2020.02)

(58) Field of Classification Search
 CPC ............. B60W 30/09; B60W 30/0956; B60W 2554/00; G08G 1/166
 See application file for complete search history.

(56) References Cited

U.S. PATENT DOCUMENTS

| 2004/0090117 | A1* | 5/2004 | Dudeck ................. B60W 10/18 303/191 |
| 2014/0207364 | A1* | 7/2014 | Eidehall ............... G05D 1/0212 701/301 |
| 2015/0210279 | A1 | 7/2015 | Agnew et al. |
| 2016/0231130 | A1* | 8/2016 | Akiyama ............. B60W 30/09 |
| 2017/0203758 | A1* | 7/2017 | Mukai ............... B60W 30/0956 |
| 2019/0118804 | A1* | 4/2019 | Toda ...................... B60W 50/14 |
| 2020/0339156 | A1* | 10/2020 | Tsuchiya ........... B60W 30/0956 |

FOREIGN PATENT DOCUMENTS

| JP | 2015-077936 A | 4/2015 |
| JP | 2015-155295 A | 8/2015 |
| JP | 2017-095100 A | 6/2017 |

* cited by examiner

*Primary Examiner* — Jelani A Smith
*Assistant Examiner* — Hana Lee
(74) *Attorney, Agent, or Firm* — Sughrue Mion, PLLC

(57) ABSTRACT

A vehicle control apparatus is provided with: a distance acquirer configured to obtain a distance between a first avoidance target and a second avoidance target in a longitudinal direction of a host vehicle when the first avoidance target is on one of left and right sides of the host vehicle and when the second avoidance target is on a far side of the first avoidance target and on another side of the host vehicle; and a controller configured or programmed to reduce a displacement amount in a lateral direction of the host vehicle, of a displacement in a direction of the host vehicle going away from the first avoidance target, which is to avoid the first avoidance target by the avoidance control, when the obtained distance is less than a predetermined distance, in comparison with when the obtained distance is greater than the predetermined distance.

2 Claims, 5 Drawing Sheets

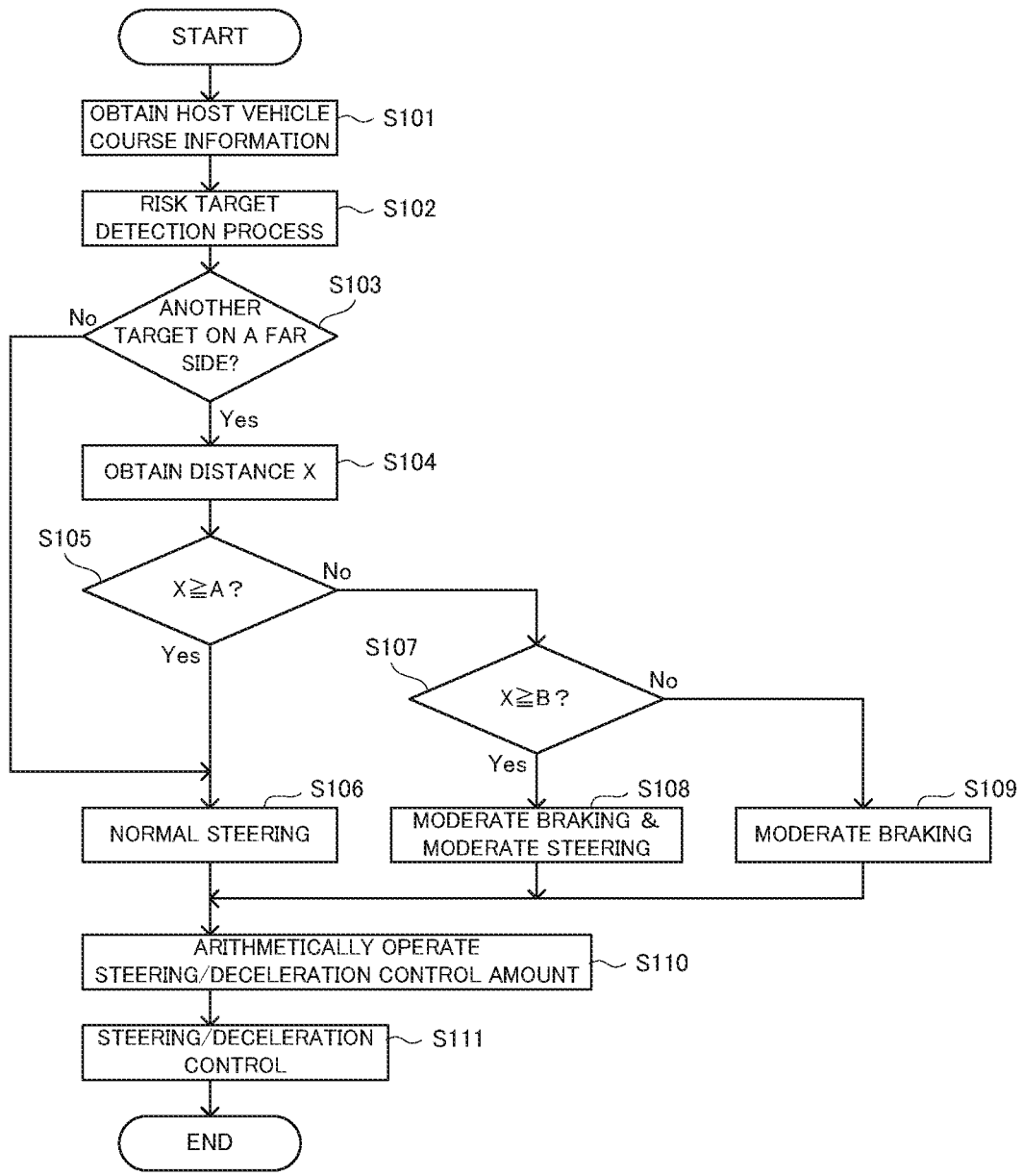

VEHICLE CONTROL APPARATUS

CROSS-REFERENCE TO RELATED APPLICATIONS

This application is based upon and claims the benefit of priority of the prior Japanese Patent Application No. 2018-199341, filed on Oct. 23, 2018, the entire contents of which are incorporated herein by reference.

BACKGROUND

1. Technical Field

Embodiments of the present disclosure relate to a vehicle control apparatus, and particularly relate to a vehicle control apparatus configured to perform an avoidance control.

2. Description of the Related Art

For this type of apparatus, for example, there is proposed an apparatus configured to perform operations including at least one of keeping a distance between a vehicle and a pedestrian in a road width direction at a maximum separation distance and braking the vehicle to decelerate a vehicle speed to a maximum safe speed, while the vehicle passes the pedestrian ahead of the vehicle (refer to Japanese Patent Application Laid Open No. 2017-095100 (Patent Literature 1) and Japanese Patent Application Laid Open No. 2015-155295 (Patent Literature 2)). Another related prior art document is Japanese Patent Application Laid Open No. 2015-077936 (Patent Literature 3).

In the technologies/techniques described in the aforementioned Patent Literatures, an occupant's feeling caused by the avoidance control is not considered. Particularly if there are a plurality of avoidance targets ahead of the vehicle and if one avoidance target is on one of the left and right sides of a road and another avoidance target is on the other side of the road, the vehicle meanders due to the avoidance control in many cases. Then, depending on the extent of a change in lateral acceleration, a yaw rate or the like, caused in the meandering, the occupant may feel uncomfortable, which is technically problematic.

SUMMARY

In view of the aforementioned problem, it is therefore an object of embodiments of the present disclosure to provide a vehicle control apparatus configured to perform an avoidance control of avoiding a plurality of avoidance targets while preventing an occupant from feeling uncomfortable.

The above object of embodiments of the present disclosure can be achieved by a vehicle control apparatus configured to perform an avoidance control when there is an avoidance target to be avoided on a course of a host vehicle, the vehicle control apparatus provided with: a distance acquirer configured to obtain a distance between a first avoidance target and a second avoidance target, each of which is the avoidance target, in a longitudinal direction of the host vehicle when the first avoidance target is on the course and on one of left and right sides of the host vehicle and when the second avoidance target is on a far side of the first avoidance target on the course and on another side of the host vehicle; and a controller configured or programmed to reduce a displacement amount in a lateral direction of the host vehicle, of a displacement in a direction of the host vehicle going away from the first avoidance target, which is to avoid the first avoidance target by the avoidance control, when the obtained distance is less than a predetermined distance, in comparison with when the obtained distance is greater than the predetermined distance.

BRIEF DESCRIPTION OF THE DRAWINGS

FIG. 3 is a flowchart illustrating operations of the vehicle control apparatus according to the first embodiment;

DETAILED DESCRIPTION OF THE EMBODIMENTS

A vehicle control apparatus according to embodiments of the present disclosure will be explained with reference to the drawings.

First Embodiment

A vehicle control apparatus according to a first embodiment will be explained with reference to FIG. 1 to FIG. 4B.

(Configuration)

Figure 1:
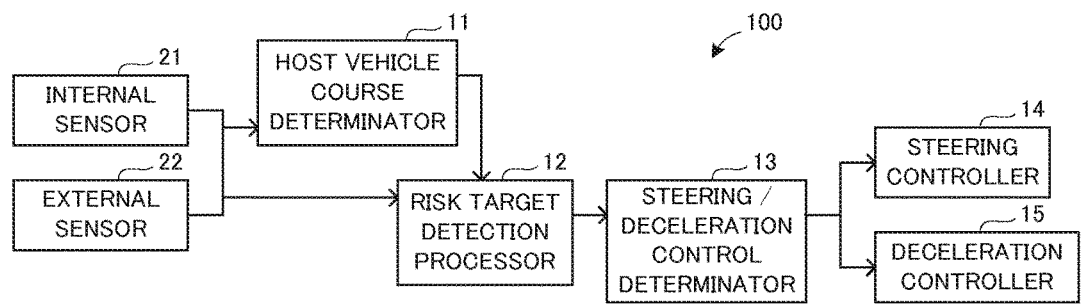
FIG. 1 is a block diagram illustrating a configuration of a vehicle control apparatus according to a first embodiment.

A configuration of the vehicle control apparatus according to the first embodiment will be explained with reference to FIG. 1. FIG. 1 is a block diagram illustrating a configuration of the vehicle control apparatus according to the first embodiment.

In FIG. 1, a vehicle control apparatus 100 is mounted on a vehicle 1. The vehicle control apparatus 100 is provided with a host vehicle course determinator 11; a risk target detection processor 12, a steering/deceleration control determinator 13, a steering controller 14, a deceleration controller 15, an internal sensor 21, and an external sensor 22.

The internal sensor 21 may include, for example, a vehicle speed sensor, a yaw rate sensor, a steering angle sensor, and the like. The internal sensor 21 may not be independently provided for the vehicle control apparatus 100, but may be shared by another apparatus or system mounted on the vehicle 1.

The external sensor 22 may include, for example, an on-vehicle camera, a millimeter wave radar, a location camera, and the like. The internal sensor 21 may not be independently provided for the vehicle control apparatus 100, but may be shared by another apparatus or system mounted on the vehicle 1.

The host vehicle course determinator 11 is configured to detect a mark line (or white line) drawn on a road from an output of the external sensor 22 (e.g., images photographed or imaged by the on-vehicle camera) and to determine (or specify) a traffic lane on which the vehicle 1 travels. The host vehicle course determinator 11 is configured to determine (or specify) a course to be taken by the vehicle 1 from an output of the internal sensor 21 (e.g., a steering angle measured by the steering angle sensor). A detailed explanation of the determination of the traffic lane and the determination of the course will be omitted because the existing technologies/techniques can be applied to the determination.

The risk target detection processor 12 is configured to detect obstacles around the vehicle 1 on the basis of the output of the external sensor 22 (e.g., images photographed or imaged by the on-vehicle camera, or a measurement result by the millimeter wave radar). The risk target detection processor 12 may detect not only the detected obstacles but also a potential risk as a hypothetical moving body, which is assumed to run out in front of the vehicle 1 from a blind spot by the obstacles. A detailed explanation of the detection of the obstacles and the detection of the potential risk will be omitted because the existing technologies/techniques can be applied to the detection.

The risk target detection processor 12 is configured to detect an avoidance target to be avoided by the vehicle 1 from the detected obstacles (and even the potential risk), on the basis of the output of the internal sensor 21 (e.g., a vehicle speed measured by the vehicle speed sensor), and on the basis of the traffic lane on which the vehicle 1 travels and the course of the vehicle 1, which are determined by the host vehicle course determinator 11. There may be not only one avoidance target but also a plurality of avoidance targets that are detected.

Out of the detected obstacles, for example, if the vehicle 1 maintains a current course, an obstacle that can be reached by the vehicle 1 within a predetermined time may be detected as the avoidance target. A method of detecting the avoidance target, however, is not limited to this.

The steering/deceleration control determinator 13 is configured to determine (i) whether or not a steering control is necessary, and (ii) whether or not a deceleration control is necessary, in order that the vehicle 1 avoids the avoidance target. Here, in order that the vehicle 1 avoids the avoidance target and safely passes by the avoidance target, it is preferable to change a side distance, which is a distance between the vehicle 1 and the avoidance target in a lateral direction (i.e., a width direction) of the road, in accordance with the vehicle speed of the vehicle 1. Specifically, the side distance is preferably increased as the vehicle speed of the vehicle 1 increases. Therefore, the steering/deceleration control determinator 13 is configured to determine (i) whether or not the steering control is necessary, and (ii) whether or not the deceleration control is necessary, for example, on the basis of the width of the traffic lane on which the vehicle 1 travels, the vehicle speed of the vehicle 1, a maximum value of the side distance that can be realized without a deviation of the vehicle 1 from the traffic lane, or the like.

The steering controller 14 is configured to calculate a steering control amount and to control a steering actuator, which is not illustrated, on the basis of the calculated steering control amount if it is determined by the steering/deceleration control determinator 13 that the steering control is necessary.

The deceleration controller 15 is configured to calculate a deceleration control amount and to control a brake actuator and a throttle actuator, which are not illustrated, on the basis of the calculated deceleration control amount if it is determined by the steering/deceleration control determinator 13 that the deceleration control is necessary.

(Objective Scene)

Out of scenes targeted by the vehicle control apparatus 100 as configured above, an objective scene in the first embodiment will be explained with reference to FIG. 2A and FIG. 2B.

Figure 2A:
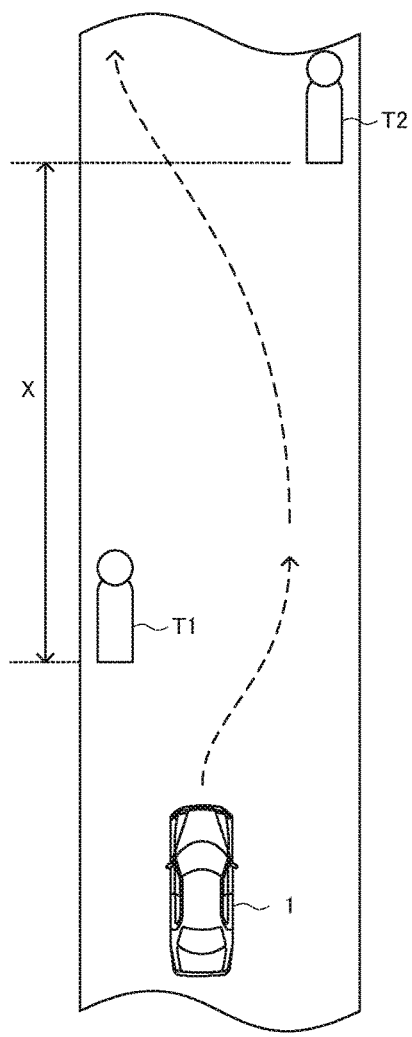
FIG. 2A is a diagram illustrating an example of a travel route when avoiding a plurality of avoidance targets.
Figure 2B:
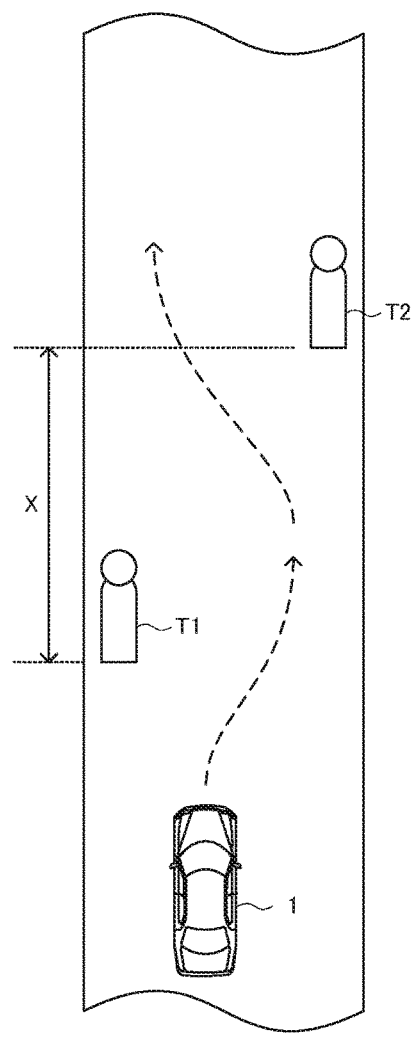
FIG. 2B is a diagram illustrating an example of the travel route when avoiding the plurality of avoidance targets.

In the first embodiment, as illustrated in FIG. 2A and FIG. 2B, the vehicle control apparatus 100 targets a scene in which there are a plurality of avoidance targets T1 and T2 ahead of the vehicle 1 and in which the avoidance target T1 is on one of the left and right sides of a road (here, on a left side of the vehicle 1) and the avoidance target T2 is on the other side of the road (here, on a right side of the vehicle).

In this case, typically, as illustrated by a dashed line in FIG. 2A and FIG. 2B, the steering control is performed on the vehicle 1 so that the vehicle 1 goes away from the avoidance target T1, and then, the steering control is performed on the vehicle 1 so that the vehicle 1 goes away from the avoidance target T2. As a result, the vehicle 1 meanders due to the avoidance targets T1 and T2.

As illustrated in FIG. 2A, if a distance X between the avoidance target T1 and the avoidance target T2 is relatively long, the extent of the meandering is relatively moderate. Thus, lateral acceleration, a yaw rate or the like felt by an occupant of the vehicle 1 may be relatively small. On the other hand, as illustrated in FIG. 2B, if the distance X is relatively short, the extent of the meandering is relatively significant. Thus, the lateral acceleration, the yaw rate or the like felt by the occupant of the vehicle 1 may be relatively large. Therefore, if a control intended only to avoid the avoidance targets T1 and T2 is performed, the occupant may feel uncomfortable depending on the distance X.

(Avoidance Operation)

In view of the aforementioned matters, an avoidance aspect is changed depending on the distance X on the vehicle control apparatus 100. Hereinafter, an avoidance operation performed by the vehicle control apparatus 100 will be explained with reference to a flowchart in FIG. 3.

In FIG. 3, the host vehicle course determinator 11 of the vehicle control apparatus 100 determines the traffic lane on which the vehicle 1 travels and the course to be taken by the vehicle 1 (step S101). Then, the risk target detection processor 12 of the vehicle control apparatus 100 detects obstacles (and even the potential risk) around the vehicle 1, and detects the avoidance target to be avoided by the vehicle 1 (corresponding to a "risk target" in FIG. 3) (step S102).

Then, when there is an avoidance target (hereinafter referred to as a "first avoidance target") that is closest to the vehicle 1 in a direction of travel of the vehicle 1, the steering/deceleration control determinator 13 of the vehicle control apparatus 100 determines whether or not there is another avoidance target (hereinafter referred to as a "second avoidance target") on a far side of the first avoidance target and on a side opposite to a side of the road on which the first avoidance target exists (step S103).

In the step S103, if it is determined that there is no second avoidance target (e.g., if there is only the first avoidance target, or if there is no other target on the side opposite to the side of the road on which the first avoidance target exists) (the step S103: No), a step S106 described later is performed.

In the step S103, if it is determined that there is the second avoidance target (the step S103: Yes), the steering/deceleration control determinator 13 obtains the distance X between the first avoidance target and the second avoidance target in a road extending direction (in other words, in a longitudinal direction of the vehicle 1) (refer to FIG. 2A and FIG. 2B) (step S104).

Then, the steering/deceleration control determinator 13 determines whether or not the distance X is greater than or equal to a distance A (step S105). In the step S105, if it is determined that the distance X is greater than or equal to the distance A (the step S105: Yes), the steering/deceleration control determinator 13 determines that the first avoidance target is to be avoided by normal steering (step S106).

Here, the "normal steering" may mean that the steering control of the vehicle 1 is to be performed to ensure the side distance corresponding to the vehicle speed of the vehicle 1 (i.e., the distance between the vehicle 1 and the avoidance target in the lateral direction of the road), which allows the vehicle 1 to safely pass by the avoidance target. If the vehicle 1 deviates from the traffic lane on which the vehicle 1 is currently traveling when the side distance is to be ensured, the deceleration control of decelerating the vehicle 1 is also performed to provide the side distance that does not allow the vehicle 1 to deviate from the traffic lane. In other words, the "normal steering" may mean allowing the vehicle 1 to avoid the avoidance target mainly by steering without decelerating the vehicle 1 as much as possible.

The "distance A" may be a value for determining whether or not the "normal steering" is to be performed, and may be set as a fixed value or a variable value corresponding to some physical quantity or parameter in advance. Such a "distance A" may be set as follows: obtaining a relation between the distance X and the lateral acceleration, the yaw rate or the like when the first and second avoidance targets are avoided by the normal steering (in other words, in the meandering) by experiments, experiences, or simulations, and setting as the distance X at which the lateral acceleration, the yaw rate or the like caused by the meandering is an upper limit of an allowable range, or as a value that is greater than the distance X by a predetermined value, for example, on the basis of the obtained relation.

In the step S105, if it is determined that the distance X is less than the distance A (the step S105: No), the steering/deceleration control determinator 13 determines whether or not the distance X is greater than or equal to a distance B (step S107). In the step S107, if it is determined that the distance X is greater than or equal to the distance B (i.e., "distance A>distance X≥distance B") (the step S107: Yes), the steering/deceleration control determinator 13 that the first avoidance target is to be avoided by moderate braking and moderate steering (step S108). On the other hand, in the step S107, if it is determined that the distance X is less than the distance B (the step S107: Yes), the steering/deceleration control determinator 13 that the first avoidance target is to be avoided by the moderate braking (step S109).

Here, the "moderate braking and moderate steering" may mean that the steering control of the vehicle 1 is to be performed to ensure the side distance corresponding to the vehicle speed of the vehicle 1, which allows the vehicle 1 to safely pass by the avoidance target, while relatively moderately decelerating the vehicle 1 so that a displacement amount in the lateral direction of the vehicle 1, of displacement in a direction of the vehicle 1 going away from the avoidance target is less than a displacement amount in the aforementioned "normal steering". Moreover, the "moderate braking" may mean that the vehicle 1 is relatively moderately decelerated to the vehicle speed that allows the vehicle 1 to safely pass by the avoidance target without steering the vehicle 1 (i.e., while maintaining a current side distance).

The "distance B" may be a value for determining whether the "moderate braking and moderate steering" is to be performed, or the "moderate braking" is to be performed, and may be set as a fixed value or a variable value corresponding to some physical quantity or parameter in advance. Such a "distance B" may be set as follows: obtaining a relation between the distance X and the time required to avoid the first and second avoidance targets by the "moderate braking" by experiments, experiences, or simulations, and setting as the distance X at which a time required to avoid the first and second avoidance targets is an upper limit of an allowable range, or as a value that is less than the distance X by a predetermined value, for example, on the basis of the obtained relation.

After the step S106, the step S108 or the step S109, at least one of the steering controller 14 and the deceleration controller 15 arithmetically operates at least one of the steering control amount and the deceleration control amount, which correspond to the avoidance aspect determined by the steering/deceleration control determinator 13 (i.e., any of the "normal steering", the "moderate braking and moderate steering", and the "moderate braking") (step S110). Then, at least one of the steering controller 14 and the deceleration controller 15 controls an actuator (e.g., a steering actuator, a brake actuator, a throttle actuator, etc.) on the basis of at least one of the steering control amount and the deceleration control amount arithmetically operated (step S111).

(Technical Effect)

In the objective scene targeted by the vehicle control apparatus 100 in the first embodiment, the presence of the first avoidance target (corresponding to the "avoidance target T1" in FIG. 2A, FIG. 2B, FIG. 4A and FIG. 4B) on one of the left and right sides of the road and the second avoidance target (corresponding to the "avoidance target T2" in FIG. 2A, FIG. 2B, FIG. 4A and FIG. 4B) on the other side of the road is detected in advance. In other words, it is predetermined that the avoidance of the first avoidance target and the avoidance of the second avoidance target are continuously performed.

At this time, simply, if the control intended only to avoid the avoidance targets T1 and T2 is performed, the occupant may feel uncomfortable depending on the distance X (i.e., the distance between the first avoidance target and the second avoidance target in the road extending direction).

On the vehicle control apparatus 100, however, as described above, the avoidance aspect of the first avoidance target is changed depending on the distance X. Specifically, if the distance X is less than the distance A and is greater than or equal to the distance B (i.e., if "A>X≥B"), the "moderate braking and moderate steering" may be selected as the avoidance aspect. If the distance X is less than the distance B (i.e., if "B>X"), the "moderate braking" may be selected as the avoidance aspect.

Figure 4A:
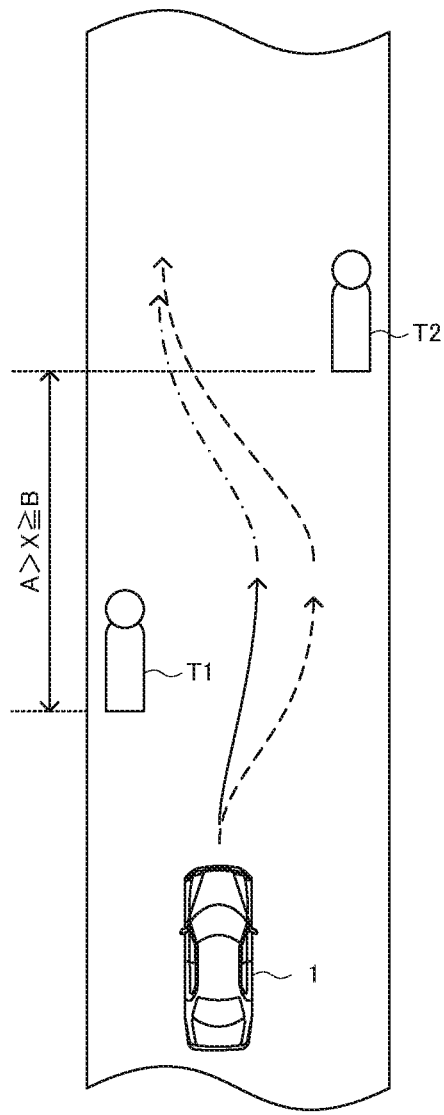
FIG. 4A is a diagram illustrating an example of a travel route caused by the operations of the vehicle control apparatus according to the first embodiment.

In FIG. 4A, a solid line arrow corresponds to a travel route when the "moderate braking and moderate steering" is performed, and a dashed line arrow corresponds to a travel route when the "normal steering" is performed. As illustrated in FIG. 4A, in the "moderate braking and moderate steering", it is possible to reduce a displacement amount in the lateral direction of the road, of displacement in the direction of the vehicle 1 going away from the avoidance target T1, when avoiding the avoidance target T1 corresponding to the first avoidance target, in comparison with in the "normal steering". Thus, even if the "normal steering" is performed when avoiding the avoidance target T2 corresponding to the second avoidance target, as illustrated in an alternate long and short line arrow in FIG. 4A, it is possible to moderate the extent of the meandering in comparison with when the "normal steering" is performed when avoiding the avoidance target T1 (refer to the dashed line arrow in FIG. 4A).

Figure 4B:
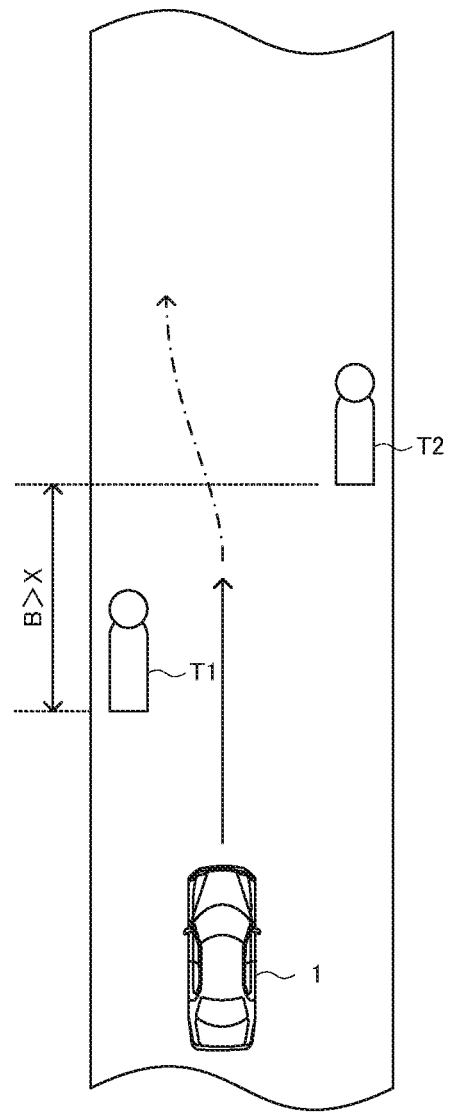
FIG. 4B is a diagram illustrating an example of the travel route caused by the operations of the vehicle control apparatus according to the first embodiment.

In FIG. 4B, a solid line arrow corresponds to a travel route when the "moderate braking" is performed. As illustrated in FIG. 4B, in the "moderate braking", the steering is not performed to avoid the avoidance target T1. Thus, even if the "normal steering" is performed when avoiding the avoidance target T2 corresponding to the second avoidance target, as illustrated in an alternate long and short line arrow in FIG. 4B, it is possible to moderate the extent of the meandering in comparison with when the "normal steering" is performed when avoiding the avoidance target T1 (refer to the dashed line arrow in FIG. 4A).

As described above, on the vehicle control apparatus 100, the avoidance aspect of the first avoidance target is changed depending on the distance X. it is therefore possible to perform the avoidance control of avoiding the plurality of avoidance targets while preventing the occupant of the vehicle 1 from feeling uncomfortable.

Second Embodiment

A vehicle control apparatus according to a second embodiment will be explained with reference to FIG. 5 and FIG. 6. The second embodiment is the same as the first embodiment described above, except that a part of the avoidance operation is different. Thus, in the second embodiment, the same explanation as that in the first embodiment will be omitted, and the same reference numerals will carry in the same parts in the drawings. An explanation will be given only to basically different points with reference to FIG. 5 and FIG. 6.

(Objective Scene)

Out of the scenes targeted by the vehicle control apparatus 100, an objective scene in the second embodiment will be explained with reference to FIG. 5.

Figure 5:
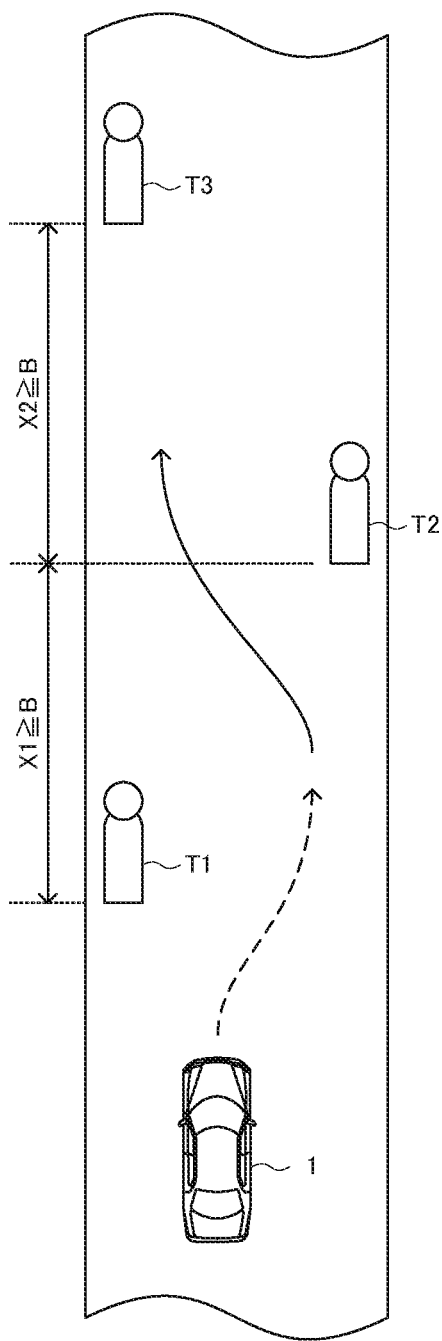
FIG. 5 is a diagram illustrating an example of a situation targeted by a vehicle control apparatus according to a second embodiment.

In the second embodiment, as illustrated in FIG. 5, the vehicle control apparatus 100 targets a scene in which there are a plurality of avoidance targets T1, T2, and T3 ahead of the vehicle 1 and in which the avoidance targets T1 and T3 are on one of the left and right sides of a road (here, on the left side of the vehicle 1) and the avoidance target T2 is on the other side of the road (here, on the right side of the vehicle). Particularly in the second embodiment, in the objective scene, the steering control is performed to avoid the avoidance target T1 (refer to a dashed line arrow in FIG. 5), and then, the steering control is performed to avoid the avoidance target T2 (refer to a solid line arrow in FIG. 5). As a result, the vehicle 1 meanders due to the avoidance targets T1 and T2.

(Avoidance Operation)

In the second embodiment, with reference to a flowchart in FIG. 5, an explanation will be given to the avoidance operation performed after the avoidance target T1 in FIG. 5 is avoided (i.e., after the avoidance target T1 is avoided by the "normal steering" or the "moderate braking and moderate steering". In this case, the avoidance target T2 in FIG. 5 corresponds to the first avoidance target according to the first embodiment, and the avoidance target T3 in FIG. 5 corresponds to the second avoidance target according to the first embodiment.

Figure 6:
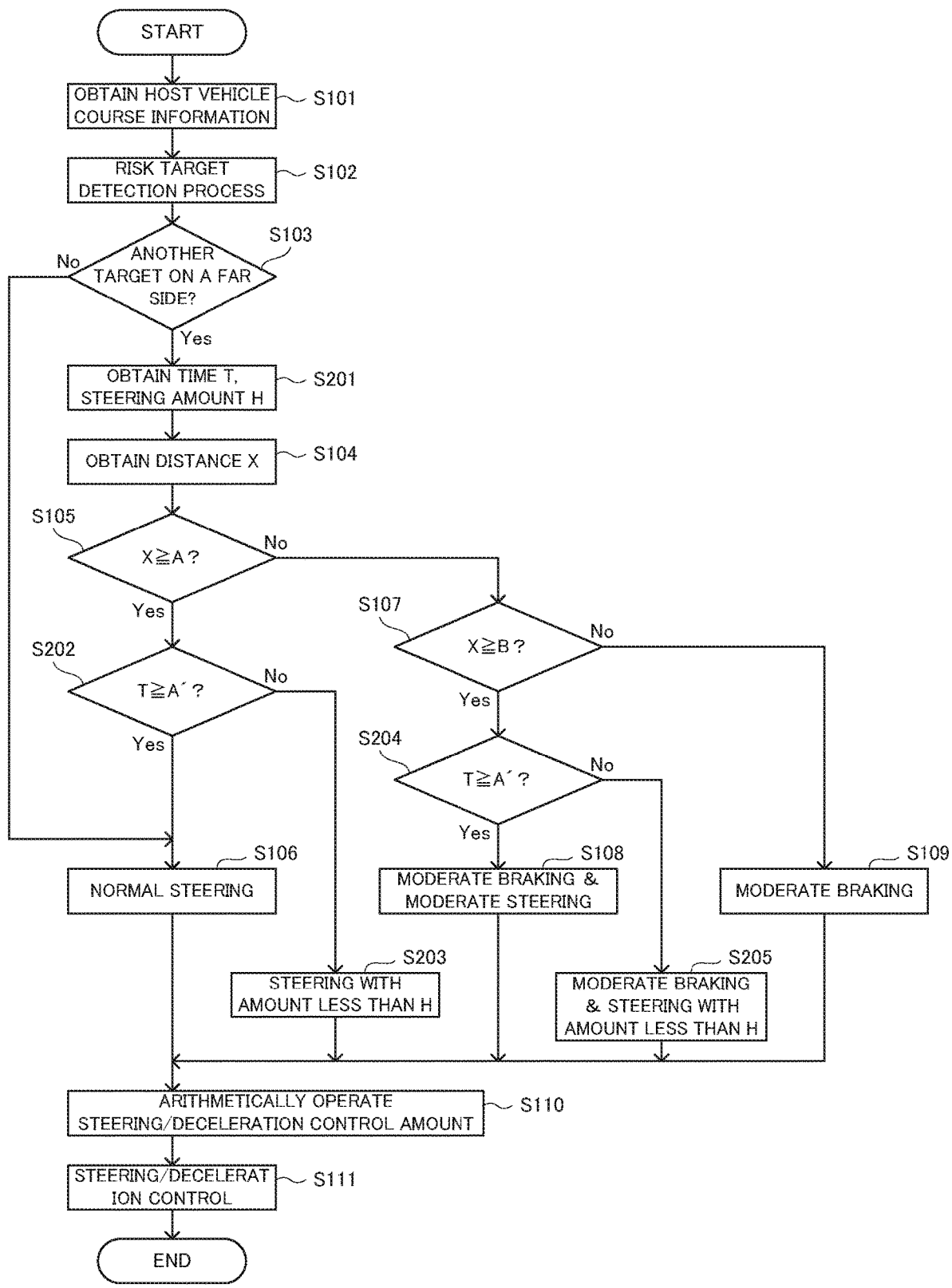
FIG. 6 is a flowchart illustrating operations of the vehicle control apparatus according to the second embodiment.

In the step S103 in FIG. 6, if it is determined that there is the second avoidance target (corresponding to the avoidance target T3 in FIG. 5) (the step S103: Yes), the steering/deceleration control determinator 13 of the vehicle control apparatus 100 obtains a time T from when the vehicle 1 passes by the avoidance target T1 (refer to FIG. 5) to when the avoidance control for avoiding the avoidance target T2 (i.e., at least one of the steering control and the deceleration control) is started, and a steering amount H associated with the steering control when avoiding the avoidance target T1 (step S201).

In parallel with the step S201, the steering/deceleration control determinator 13 obtains the distance X (here, corresponding to a distance X2 between the avoidance target T2 and the avoidance target T3 in FIG. 5) (the step S104).

Then, in the step S105, if it is determined that the distance X is greater than or equal to the distance A (the step S105; Yes), the steering/deceleration control determinator 13 determines whether or not the time T is greater than or equal to a time A' (step S202). In the step S202, if it is determined that the time T is greater than or equal to the time A' (the step S202; Yes), the steps after the step S106 are performed. On the other hand, in the step S202, if it is determined that the time T is less than the time A' (the step S202; No), the steering/deceleration control determinator 13 determines that the avoidance target T2 is to be avoided by the steering control with a target steering control amount that is less than the steering amount H (step S203). At this time, if it is predicted that the side distance, which is the distance between the vehicle 1 and the avoidance target T2 in the lateral direction of the road, is shorter than the distance that allows the vehicle 1 to safely pass by the avoidance target T2, then, the steering/deceleration control determinator 13 may perform the deceleration control of decelerating the vehicle 1, in addition to the aforementioned steering control.

The "time A'" may be a value for determining whether or not the steering control with the target steering control amount that is less than the steering amount H is to be performed, and may be set as a fixed value or a variable value corresponding to some physical quantity or parameter in advance. Such a "time A'" may be set as follows: obtaining a relation between the time from when the vehicle 1 is steered to one of the left and right sides to avoid one avoidance target to when the steering to the other of the left and right sides is started to avoid another avoidance target, and a steering amount when the vehicle 1 is steered to the other of the left and right side by experiments, experiences, or simulations, and setting as a time in which a steering amount when the vehicle 1 is steered to the other of the left and right sides is equal to a steering amount when the vehicle 1 is steered to the one of the left and right sides, or as a value that is greater than the time by a predetermined value, for example, on the basis of the obtained relation.

In the step S107, if it is determined that the distance X is greater than or equal to the distance B (i.e., "distance A>distance X≥distance B") (the step S107: Yes), the steering/deceleration control determinator 13 determines whether or not the time T is greater than or equal to the time A' (step S204). In the step S204, if it is determined that the time T is greater than or equal to the time A' (the step S204; Yes), the steps after the step S108 are performed. On the other hand, in the step S204, if it is determined that the time T is less than the time A' (the step S204; No), the steering/deceleration control determinator 13 determines that the avoidance target T2 is to be avoided by the "moderate braking and moderate steering" with a target steering control amount that is less than the steering amount H (step S205).

(Technical Effect)

If the avoidance targets T1 and T2 illustrated in FIG. 5 are continuously avoided by the steering control, the vehicle 1 is steered to approach an edge of one of the left and right sides of the road (i.e., on the right side of the vehicle 1 in FIG. 5), and then, the vehicle 1 is steered to approach an edge of the other side (i.e., on the left side of the vehicle 1 in FIG. 5). At this time, if the steering control for avoiding the avoidance target T2 is performed without taking any measures even though only a relatively short time passes from when the avoidance of the avoidance target T1 is ended to when the avoidance of the avoidance target T2 is started, then, for example, the behavior of the vehicle 1 may become unstable, or the occupant of the vehicle 1 may feel uncomfortable.

On the vehicle control apparatus 100, as described above, restrictions are imposed on the target steering control amount associated with the steering control in accordance with the time T (i.e., the time from when the vehicle 1 passes by the avoidance target T1 to when the avoidance control for avoiding the avoidance target T2 is started). Therefore, according to the vehicle control apparatus 100, for example, it is possible to prevent the behavior of the vehicle 1 from becoming unstable due to the avoidance of the avoidance target T2, or to prevent the occupant from feeling uncomfortable.

Various aspects of embodiments of the present disclosure derived from the embodiments explained above will be explained hereinafter.

A vehicle control apparatus according to an aspect of embodiments of the present disclosure is a vehicle control apparatus configured to perform an avoidance control when there is an avoidance target to be avoided on a course of a host vehicle, the vehicle control apparatus provided with: a distance acquirer configured to obtain a distance between a first avoidance target and a second avoidance target, each of which is the avoidance target, in a longitudinal direction of the host vehicle when the first avoidance target is on the course and on one of left and right sides of the host vehicle and when the second avoidance target is on a far side of the first avoidance target on the course and on another side of the host vehicle; and a controller configured or programmed to reduce a displacement amount in a lateral direction of the host vehicle, of a displacement in a direction of the host vehicle going away from the first avoidance target, which is to avoid the first avoidance target by the avoidance control, when the obtained distance is less than a predetermined distance, in comparison with when the obtained distance is greater than the predetermined distance. In the aforementioned embodiments, the "steering/deceleration control determinator 13" corresponds to an example of the "distance acquirer" and the "controller". The "distance A" according to the aforementioned embodiments corresponds to an example of the "predetermined distance".

When there is the first avoidance target on one of left and right sides of the host vehicle on the course and when there is the second avoidance target on the other side, the host vehicle meanders after avoiding the first and second avoidance targets due to the steering control, which is the avoidance control. At this time, if the steering control is performed without taking any measures, an occupant of the vehicle may feel uncomfortable depending on the distance between the first avoidance target and the second avoidance target in the longitudinal direction of the host vehicle. That is because, as a result of the avoidance control, in the case of a constant steering amount when the host vehicle meanders, the extent of the meandering when the distance is relatively short is more significant than that when the distance is relatively long.

Thus, on the vehicle control apparatus, the displacement amount in the lateral direction of the host vehicle, of the displacement in the direction of the host vehicle going away from the first avoidance target, which is to avoid the first avoidance target by the avoidance control, is reduced when the distance is less than the predetermined distance, in comparison with when the distance is greater than the predetermined distance. Here, the expression "the displacement amount in the lateral direction is reduced" may be realized not only (i) by reducing the steering amount when the distance is less than the predetermined distance in comparison with when the distance is greater than the predetermined distance, but also (ii) by not performing the steering when the distance is less than the predetermined distance. In this case, as the avoidance control, a deceleration control of decelerating the host vehicle may be performed instead of the steering control.

According to the vehicle control apparatus as configured above, it is possible to suppress the extent of the meandering even though the first and second avoidance targets are avoided by the steering control, which is the avoidance control. As a result, according to the vehicle control apparatus, it is possible to perform the avoidance control of avoiding a plurality of avoidance targets while preventing the occupant from feeling uncomfortable.

In an aspect of the vehicle control apparatus, after the host vehicle avoiding the first avoidance target as a part of the avoidance control by being steered in a direction of the host vehicle going away from the first avoidance target, when the host vehicle is steered in a direction of the host vehicle going away from the second avoidance target for avoiding the second avoidance target as another part of the avoidance control, said controller is configured or programmed in such a manner that a steering amount associated with steering performed in the direction of the host vehicle going away from the second avoidance target is reduced in comparison with a steering amount associated with steering performed in the direction of the host vehicle going away from the first avoidance target, on condition that a time from when the host vehicle passes the first avoidance target to when the another part of the avoidance control is started is less than a predetermined time. The "time A'" according to the aforementioned embodiments corresponds to an example of the "predetermined time".

The direction of going away from the first avoidance target and the direction of going away from the second avoidance target are opposite to each other. Thus, if the steering performed in the direction of going away from the first avoidance target and the steering performed in the direction of going away from the second avoidance target are continuously performed in a relatively short period without taking any measures, then, for example, the behavior of the host vehicle may become unstable, or the occupant of the host vehicle may feel uncomfortable due to the steering, which is the avoidance control.

Thus, on the vehicle control apparatus, if the first avoidance target is avoided by the steering and then the second avoidance target is avoided by the steering, the steering amount associated with the steering for avoiding the second avoidance target is reduced in comparison with the steering amount associated with the steering for avoiding the first avoidance target, on condition that the time from when the host vehicle passes the first avoidance target to when the steering for avoiding the second avoidance target is started is less than the predetermined time. Therefore, according to the vehicle control apparatus, it is possible to prevent the behavior of the host vehicle from becoming unstable due to the avoidance control, or to prevent the occupant from feeling uncomfortable.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus configured to perform an avoidance control when there are avoidance targets to be avoided on a course of a host vehicle, said vehicle control apparatus configured to:

obtain a distance between a first avoidance target and a second avoidance target, each of which is an avoidance target, in a longitudinal direction of the host vehicle when the first avoidance target is on the course and on one of a left side and a right side of the host vehicle and when the second avoidance target is on an opposing side of the first avoidance target on the course and on another of the left side and the right side of the host vehicle; and reduce a displacement amount in a lateral direction of the host vehicle when the host vehicle moves away from the first avoidance target in order to avoid the first avoidance target by the avoidance control, when the obtained distance is less than a predetermined distance, in comparison with when the obtained distance is greater than the predetermined distance.

2. The vehicle control apparatus according to claim 1, wherein after the host vehicle avoids the first avoidance target as a part of the avoidance control by being steered in the direction of the host vehicle going away from the first avoidance target, when the host vehicle is steered in a direction of the host vehicle going away from the second avoidance target for avoiding the second avoidance target as another part of the avoidance control, said vehicle control apparatus is configured in such a manner that a steering amount associated with steering performed in the direction of the host vehicle going away from the second avoidance target is reduced in comparison with a steering amount associated with steering performed in the direction of the host vehicle going away from the first avoidance target, on condition that a time from when the host vehicle passes the first avoidance target to when the another part of the avoidance control is started is less than a predetermined time.

* * * * *